(12) United States Patent
Andre et al.

(10) Patent No.: US 7,162,123 B2
(45) Date of Patent: Jan. 9, 2007

(54) OPTICAL FIBER HAVING AT LEAST ONE BRAGG GRATING OBTAINED BY WRITING DIRECTLY THROUGH THE COATING COVERING THE CLADDING

(75) Inventors: Sébastien Andre, Pignan (FR); Xavier Andrieu, Bretigny sur Orge (FR); Dalila Make, St Germain les Arpajon (FR); Fabrice Poussiere, Massy (FR); Fréderic Masson, Staffelfelden (FR)

(73) Assignee: Alcatel, Paris (FR)

( * ) Notice: Subject to any disclaimer, the term of this patent is extended or adjusted under 35 U.S.C. 154(b) by 189 days.

(21) Appl. No.: 10/748,282

(22) Filed: Dec. 31, 2003

(65) Prior Publication Data

US 2005/0129360 A1   Jun. 16, 2005

(30) Foreign Application Priority Data

Jan. 3, 2003   (FR)   .................................. 03 00026

(51) Int. Cl.
*G02B 6/34* (2006.01)
*G02B 6/36* (2006.01)

(52) U.S. Cl. ........................................ 385/37; 385/128

(58) Field of Classification Search ...................... None
See application file for complete search history.

(56) References Cited

U.S. PATENT DOCUMENTS 5,773,486 A    6/1998   Chandross et al.
5,989,627 A   11/1999   Blyler, Jr. et al.
6,396,983 B1    5/2002   Atkins et al.

FOREIGN PATENT DOCUMENTS

EP   0 990 625 A   4/2000
EP   1 172 391 A   1/2002

OTHER PUBLICATIONS

K. Imamura et al, "High reliability tin-codoped germanosilicate fibre Bragg gratings fabricated by direct writing method", Electronics Letters, IEE Stevenage, GB, vol. 34, No. 18, Sep. 3, 1998, pp. 1772-1773, XP006010237.
U.S. Appl. No. 10/748,278 filed Dec. 31, 2003, entitled "An Optical Fiber having at Least One Bragg Grating Obtained by Writing Directly Through the Coating Covering and Cladding".
C. Decker, "High-speed curing by Laser Irradiation", Nuclear Instruments & Methods In Physics Research, Section-B: Beam Interactions With Materials And Atoms, North-Holland Publishing Co., Amsterdam, NL, vol. 151, Nr. 1-4, pp. 22-28, XP004416403.

*Primary Examiner*—Michelle Connelly-Cushwa
*Assistant Examiner*—Jerry T. Rahll
(74) *Attorney, Agent, or Firm*—Sughrue Mion, PLLC

(57) ABSTRACT

The present invention relates to an optical fiber (1') having at least one Bragg grating (11), the fiber comprising a core (2) surrounded successively by cladding (3) and a coating (4), said fiber being obtained by writing said grating in the core and/or the cladding directly through the coating which is made of a material containing an organic substance that is substantially transparent to the ultraviolet type radiation used for writing said grating, wherein the material of said coating contains an inorganic substance that is not miscible with the organic substance and that is distributed in substantially uniform manner in said material.

14 Claims, 2 Drawing Sheets

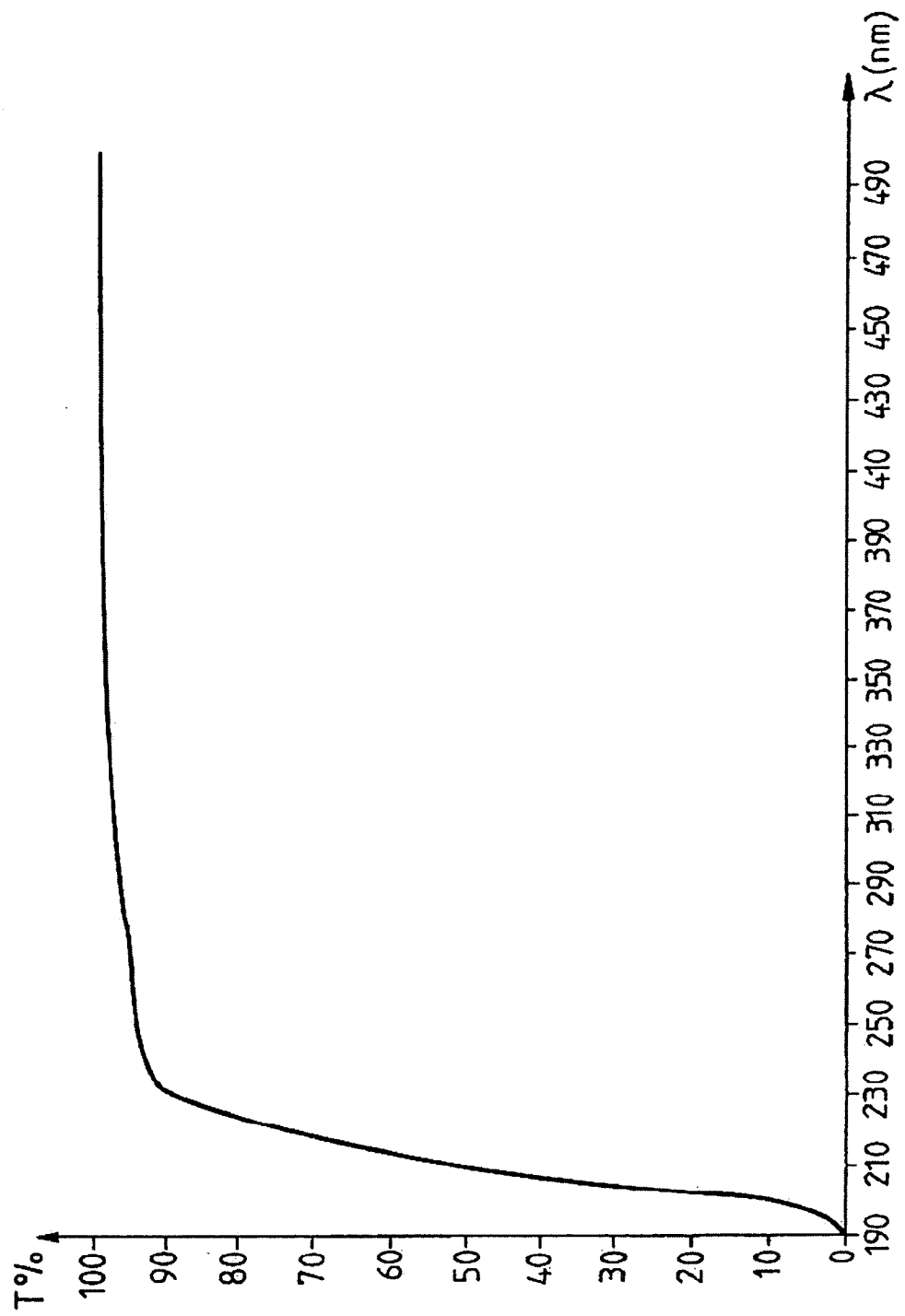

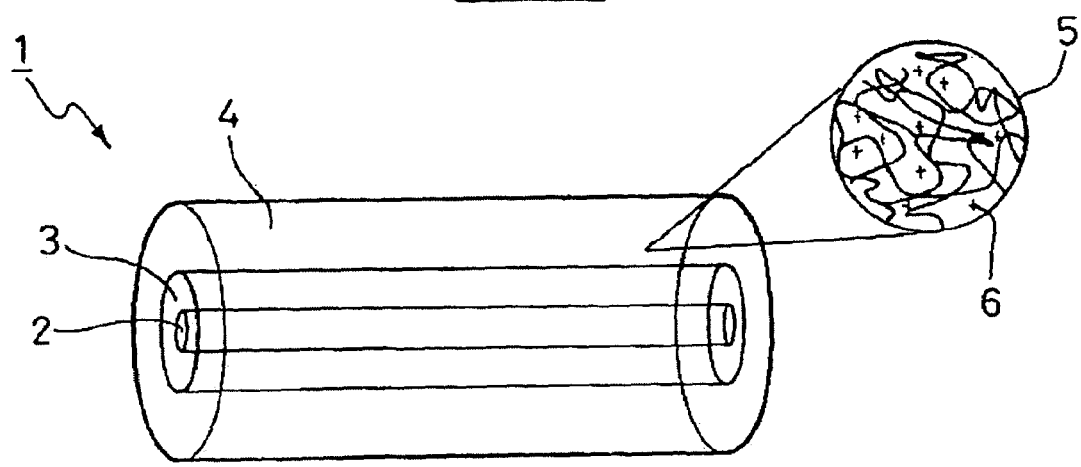
FIG_2
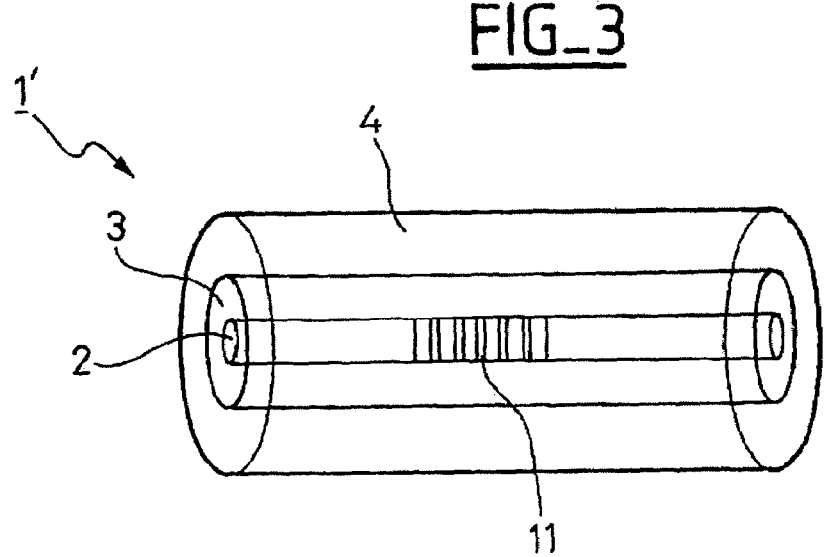
FIG_3

OPTICAL FIBER HAVING AT LEAST ONE BRAGG GRATING OBTAINED BY WRITING DIRECTLY THROUGH THE COATING COVERING THE CLADDING

The present invention relates to an optical fiber having at least one Bragg grating obtained by writing directly through the coating covering the cladding, and also to a method of manufacturing an optical fiber having at least one Bragg grating.

In known manner, optical fibers with a Bragg grating comprise a germanium-doped silica core covered successively by silica cladding and by a coating of material selected to be transparent and to withstand the temperature of the radiation used for writing the grating, which radiation is generally emitted by an ultraviolet (UV) type laser. This enables the Bragg grating to be written in the core and/or the cladding directly through said coating.

The document entitled "Grating writing through fiber coating at 244 nm and 248 nm" by Chao et al., Electronics Letters, May 27, 1999, Vol. 35, No. 11, pp. 924–925, thus discloses a fiber having a Bragg grating obtained by writing the grating directly in the core of the fiber through its coating.

The coating is of silicone which presents transmittance equal to about 90%, in particular at the two UV wavelengths conventionally used for writing gratings: 244 nm and 248 nm. The ability of such silicone to withstand temperature is demonstrated by being placed in an oven at 300° C. for 3 minutes (min).

The smallest Bragg grating described is 1 centimeter (cm) long and presents low contrast, i.e. variation in refractive index, of $2 \times 10^4$, corresponding to reflectivity of 92%.

Furthermore, writing is performed using a technique in which the laser beam is scanned, and that requires complex apparatus.

The mechanical properties of that silicone are unsatisfactory, particularly in terms of longevity, and for example the fiber can deteriorate during storage. Furthermore, that silicone does not withstand water sufficiently, which is critical for undersea connections.

The silicone is produced under the reference RTV615 by the supplier General Electric and is obtained from a two-component composition that sets at ambient temperature, in six to seven days at 25° C., and that comprises, in conventional manner, two precursors of silicone for mixing together immediately before application to the cladding of the fiber. The lifetime of the mixture is 4 hours.

That composition has low viscosity and is difficult to put into form. As soon as the two precursors have come into contact, the viscosity of the mixture varies very quickly which means that the thickness of the coating which is equal to 60 micrometers (μm) on average is not constant over the entire length of the fiber. In addition, the fiber cannot be reeled onto itself quickly since the setting time is of the order of several days. Contact between two lengths of fiber during setting leads to the coatings of the lengths becoming stuck together.

An object of the invention is to mitigate the above-mentioned problems by providing an optical fiber with at least one Bragg grating obtained by writing directly through the coating covering the cladding, the coating being optimized in terms of ability to withstand temperature, in terms of ability to withstand photochemical attack, and in terms of transparency to the type of UV radiation used for writing. The fiber must have good mechanical properties, long lifetime, and the Bragg gratings must present optical properties that are adjusted as a function of the intended applications.

To this end, the invention provides an optical fiber having at least one Bragg grating, the fiber comprising a core surrounded in succession by cladding and a coating, said fiber being obtained by writing said grating directly in the core and/or the cladding through the coating which is made of a material containing an organic substance that is substantially transparent to the ultraviolet radiation used for writing said grating, the optical fiber being characterized in that the material of said coating contains an inorganic substance that is not miscible with the organic substance and that is distributed in substantially uniform manner in said material.

The material of the invention is a material that is uniform in the sense that it presents substantially the same properties at all points of the material, and it is a material that is isotropic in the sense that it presents the same properties in all directions in three dimensions.

The combined presence of the inorganic substance and the organic substance does not lead to undesirable chemical or physical reactions leading to a reduction in physical performance, nor does it lead to the structure varying over time. On the contrary, the material of the invention presents properties that are the cumulative sum of the properties of each of the two substances.

The organic substance is selected to confer transparency to ultraviolet radiation on the coating material. The organic substance may contain one or more of the following chemical bonds: C—C, C—Si, C—I, C—H, C—O, O—H, Si—O, Si—H, C—F, C—Cl, Ge—C, Ge—Si, which bonds do not present significant absorbance in the ultraviolet at wavelengths longer than or equal to 240 nm.

The organic substance may be free from aromatic rings, and free of conjugated unsaturations, since such elements absorb ultraviolet radiation strongly.

By way of example, additives generally contain such groups and are to be avoided because of their opaqueness.

Similarly, metal-based catalysts, and in particular platinum-based catalysts such as $Pt(AcAc)_2$, $PtCpMe_3$ used for obtaining a polymer by hydrosilylation are to be avoided, particularly since the presence of metals reduces the longevity of the fiber.

The inorganic substance is selected to confer on the coating material of the invention improved mechanical properties (storability, resistance to fatigue, to traction, to impact), improved adhesion to the cladding, improved ability to withstand water and organic solvents, and a better control over viscosity so as to make it easier to form the coating and obtain better control of its thickness over the entire length of the fiber.

In addition, the inorganic substance does not spoil transparency but does increase the ability of the coating to withstand temperature and photochemical effects. This avoids any deterioration of the fiber induced by the radiation used for writing, even at high levels of fluence (energy density), e.g. greater than 1000 joules per square centimeter ($J.cm^{-2}$).

In addition, the surface state of the coating material, and in particular its roughness, is more controllable and improves the transmittance profile of the coating, thus making it possible in particular to reduce the time taken for writing.

A broad range of properties is obtained by changing the nature, the composition, and the proportion of the inorganic substance.

Advantageously, the inorganic substance may be selected from a mineral filler, and a reinforcing agent, and preferably contains particles having a mean grain size smaller than one-twentieth the wavelength of said writing radiation, for example wavelengths lying in the range 190 nanometers (nm) to 400 nm, and in particular standard values of 244 nm, 248 nm, 266 nm, 302 nm, and 355 nm, or the wavelengths of UV lasers that are available on the market.

This limit on mean grain size makes it possible to avoid any diffraction or other phenomenon distorting the radiation used for writing, and thus makes it possible to obtain the intended Bragg grating.

According to a characteristic, the inorganic substance contains silica which is preferably pyrogenic.

The choice of silica is particularly suitable when the organic substance contains mainly silicone.

The coating material may comprise any proportions that enable the physical properties of the coating to be improved.

According to a preferred characteristic, the coating material may comprise up to 30% by weight of the inorganic substance, and when the inorganic substance contains silicone, the material comprises 1.2% to 5% by weight of the inorganic substance and preferably about 2.75% by weight.

The Bragg grating may present contrast of $7.4 \times 10^{-4}$ for a grating having a length of 1 millimeter (mm), and contrast of $2.3 \times 10^{-4}$ for a grating having a length of 5 mm. Such gratings are usable for gain-equalizing gratings, for reflector gratings performing routing functions, for laser resonators, or for chromatic dispersion compensators.

The invention naturally applies to an optical device incorporating an element made of a material as defined above.

The invention is naturally suitable for manufacturing devices containing a fiber as defined above. By way of example, mention can be made of optical fibers, demultiplexers, dispersion compensators, and in particular gain equalizing filters, and most particularly passive tilt equalizing (PTEQ) filters.

The material may also be used for any element other than a fiber whenever UV transparency and/or ability to withstand high temperatures and/or chemical attack is of use. For example, the element may be an adhesive, a phase mask, or an optical component.

The invention also provides a method of manufacturing a fiber having at least one Bragg grating as defined above, said method including a step of forming said coating on the cladding and a step of writing said grating in the core and/or the cladding through said coating by using a source of writing radiation. The step of forming the coating comprises:

preparing a settable mixture containing said inorganic substance and a liquid organic substance containing at least one polymer precursor that is settable;

applying the settable mixture on said cladding as a single layer; and causing the settable mixture to set so as to form said material.

Adding the inorganic substance makes the mixture more viscous and thus easier to apply.

By selecting a polymer precursor that is thermosetting, it suffices merely to include one or more ovens in the fiber-drawing tower in order to obtain the material.

By selecting a polymer precursor that is photosetting, it suffices merely to integrate one or more sources of UV radiation in the fiber-drawing tower in order to obtain the material.

The step of writing said grating is preferably performed statically and not by scanning as in the prior art.

The polymer precursor is preferably selected from a thermosetting silicone precursor and a photosetting silicone precursor.

The features and advantages of the invention appear clear on reading the following description given by way of illustrative and non-limiting example and made with reference to the accompanying figures, in which:

FIG. 1 shows the profile of transmittance T (expressed in %) as a function of wavelength (expressed in nm) for a silica substrate coated in a material of the invention having thickness of 60 µm;

FIG. 2 shows an optical fiber obtained after forming a coating on the cladding of an optical fiber that is to have a grating photo-induced therein, in accordance with the invention; an FIG. 3 shows a fiber with a Bragg grating in the preferred embodiment of the invention.

The invention lies in selecting a material containing an organic substance and an inorganic substance that is not miscible with the organic substance and that is distributed in substantially uniform manner in the material, which substances are selected for forming a coating on an optical fiber having one or more Bragg gratings, i.e. enabling the coating to be obtained quickly and allowing one or more Bragg gratings to be written directly therethrough also imparting good mechanical properties to the fiber.

The step of forming the coating comprises initially preparing a settable mixture containing:

an inorganic substance comprising up to 30% by weight, preferably containing particles having a mean grain size smaller than one-twentieth the wavelength of the writing radiation, which wavelength is selected to be equal to 248 nm, for example; and a liquid organic substance containing at least one settable polymer precursor preferably selected from polymer precursors that are thermosetting and polymer precursor that are photosetting.

Preferably, the inorganic substance is pyrogenic silica and the polymer precursor is a thermosetting silicone precursor, e.g. the two-component product sold under the reference LSR1551 by the supplier Dow Corning.

In this configuration, the mixture contains 1.2% to 5% by weight of pyrogenic silica and preferably about 2.75% by weight.

The settable mixture has viscosity that is controlled and equal to 6000 millipascal seconds (mPa·s) at 25° C., and it is subsequently applied as a single layer of thickness equal to 60 µm using a tower for coating the substance on the cladding of a fiber.

Passing through an oven at 100° C. followed by annealing at 150° C. causes said material to be formed. Thereafter, the coating is transparent in appearance and it is not sticky.

The resulting material is free from any aromatic rings, and it is free from any conjugated unsaturations, it is transparent, and it withstands radiation of the ultraviolet type used for writing a Bragg grating.

FIG. 1 shows the profile of transmittance T (expressed in %) as a function of wavelength (expressed in nm) of a silica substrate coated in a 60 µm thick layer of the above-described material.

In FIG. 1, it can be seen that transmittance T exceeds 90% in the range 215 nm to 500 nm, i.e. a broad range of wavelengths.

60 µm is the present standard thickness for coating a fiber having at least one Bragg grating.

For other layer thicknesses, transmittances at 248 nm are as follows:

for 20 µm: 99%;
for 30 µm: 98%;
for 124 µm: 91.5%;
for 240 µm: 87%.

In a variant, it is possible to select a silicone precursor that is photosetting, responding to a wavelength that is optionally different from that used for writing the grating, given that the silicone becomes transparent once it has been cross-linked, and for example the precursor may be selected from the following list of products:

Ebecryl 350, Ebecryl 1360 from the supplier UCB;
UVS-500 from the supplier Croda;
additive 97-168, additive 97-169, additive 99-622 Rahn from the supplier Genomer;
rad 2100, rad 2200, rad 2500, rad 2600, rad 2700 (Tego chemie) DMS-U22 from the supplier Gelest;
products in the UV silcolease range from the supplier Rhodia;
DMS-R01, DMS-R05, DMS-R18, DMS-R22, DMS-R31 (Gelest);
poly [dimethylsiloxane-co-[2-(3,4-epoxycyclohexyl) ethyl] methylsiloxane] from the supplier Aldrich.

It is important to select a photoinitiator (where necessary) that does not absorb at the writing wavelengths after passing through an appropriate UV oven.

The organic substance may also be a polymer other than a silicone, providing the substance is transparent to UV radiation.

Amongst polymers that are free from aromatic rings and free from conjugated unsaturations, mention can be made of the following:

a polyacrylate such as the products Repolem 1137, Repolem PHE05 from the supplier Atofina;
a thermoplastic polymer selected from polyvinylidene fluorides (PVDF) and copolymers of PVDF and hexafluoropropene (HFP) such as the Kynar products from the supplier Atofina;
polyethylene glycol acrylates, polyurethane aliphatic acrylates.

The fiber of the invention obtained after forming the coating is shown in longitudinal view in FIG. 2 where it can be seen that the optical fiber 1 comprises a core 2 of germanium-doped silica covered successively in silica cladding 3 and in the coating of the material 4.

This fiber can be wound without breaking onto a reel for hydrogenation, and it can be stored for several months on the reel.

The silicone 5 (see enlarged zone in FIG. 2) forms the matrix of the coating and the pyrogenic silica 6 corresponds to reinforcement.

The Bragg grating is written in the fiber 1 statically. The writing radiation coming from a UV laser source, for example, is at a wavelength selected to be 248 nm, for example.

Writing conditions are as follows:
mean energy density: 70 millijoules per centimeter (mJ/cm);
duration of writing: 12 min;
frequency: 20 hertz (Hz);
giving a total fluence (energy density) of 1010 J/cm$^2$.
The characteristics of the Bragg grating are as follows:
written length: 1 mm;
contrast: $7.4 \times 10^{-4}$;
depth: 6 decibels (dB) at 1571 nm.

The contrast achieved is very high without damaging the coating even when a very high energy density is selected: the material thus presents very high resistance to photochemical and high temperature effects.

In a variant, e.g. when the fiber having a Bragg grating is for use in gain equalizing arrays, arrays of reflectors for routing purposes, for laser resonators, or for chromatic dispersion compensators, grating-writing conditions are as follows:
mean energy density: 45.5 mJ/cm;
duration of writing: 29 min;
giving a total fluence (energy density) of 1580 J/cm$^2$;
frequency 20 Hz.
The characteristics of the Bragg grating are then as follows:
written length: 5 mm;
contrast: $2.3 \times 10^{-4}$;
depth: 11.8 dB at 1559 nm.

FIG. 3 is a longitudinal view of a fiber 1' having a Bragg grating 11 in a preferred embodiment of the invention.

The fiber 1' as obtained in this way is for incorporating, for example, in an optical device (not shown) e.g. of the signal repeater or filter type in long distance optical transmission.

In a variant, in order to increase the refractive index of the coating to above 1.45 (which corresponds to the index of germanium-doped silica), appropriate refractive index additives are added to the settable mixture in order to manufacture an effective slanted Bragg grating.

Naturally, the invention is not limited to the embodiment described above.

The fiber may contain a plurality of Bragg gratings, and the length of the or each Bragg grating is to be adapted as a function of the intended application. The conditions under which a grating is written can be modified, e.g. for the purpose of increasing contrast and/or depth.

Finally, any means may be replaced by equivalent means without going beyond the ambit of the invention.

The invention claimed is:

1. An optical fiber having at least one Bragg grating, the fiber comprising a core surrounded in succession by a cladding and a coating, said fiber being obtained by writing said grating directly in at least one of the core and the cladding through the coating wherein the coating is made of a material comprising an organic substance that is substantially transparent to ultraviolet radiation used for writing said grating, and an inorganic substance that is not miscible with the organic substance and that is distributed in a substantially uniform manner in said material.

2. The optical fiber having at least one Bragg grating according to claim 1, in which the inorganic substance is selected from a mineral filler and a reinforcing agent.

3. The optical fiber having at least one Bragg grating according to claim 2, wherein the inorganic substance further comprises particles of mean grain size smaller than one-twentieth the wavelength of said radiation for writing.

4. The optical fiber having at least one Bragg grating according to claim 1, in which said coating material comprises up to 30% by weight of the inorganic substance.

5. The optical fiber having at least one Bragg grating according to claim 1, in which the Bragg grating presents contrast of $7.4 \times 10^{-4}$ for a grating of length 1 mm and contrast of $2.3 \times 10^{-4}$ for a grating of length 5 mm.

6. The optical fiber having at least one Bragg grating according to claim 1, in which the inorganic substance is silica.

7. The optical fiber having at least one Bragg grating according to claim 6, wherein the inorganic substance is pyrogenic silica.

8. An optical device incorporating a fiber having a Bragg grating as defined in any one of claims 1 to 5.

9. The optical fiber having at least one Bragg grating according to claim 1, wherein the organic substance comprises silicone and the inorganic substance is 1.2% to 5% by weight of the coating material.

10. The optical fiber having at least one Bragg grating according to claim 9, wherein the inorganic substance is 2.75% of the coating material.

11. A method of manufacturing an optical fiber having at least one Bragg grating, the fiber comprising a core surrounded successively by a cladding and by a coating, said fiber being obtained by writing said grating directly in one or both of the core and the cladding through the coating, wherein the coating is made of a material comprising an organic substance that is substantially transparent to ultraviolet type radiation used for writing said grating, said method comprising a step of forming said coating on the cladding and a step of writing said grating in at least one of the core and the cladding through said coating by using a source of writing radiation, in which the step of forming the coating comprises:

preparing a settable mixture containing said inorganic substance and a liquid organic substance which comprises at least one polymer precursor that is settable;

applying the settable mixture on said cladding as a single layer; and causing the settable mixture to set so as to form said material; and wherein the at least one polymer precursor is selected from a thermosetting silicone precursor and a photosetting silicone precursor.

12. A method of manufacturing an optical fiber having at least one Bragg grating, the fiber comprising a core surrounded successively by a cladding and by a coating, said fiber being obtained by writing said grating directly in one or both of the core and the cladding through the coating, wherein the coating is made of a material comprising an organic substance that is substantially transparent to ultraviolet type radiation used for writing said grating, and an inorganic substance that is not miscible with the organic substance and that is distributed in a substantially uniform manner in said material, said method comprising a step of forming said coating on the cladding and a step of writing said grating in at least one of the core and the cladding through said coating by using a source of writing radiation, in which the step of forming the coating comprises:

preparing a settable mixture containing said inorganic substance and a liquid organic substance which comprises at least one polymer precursor that is settable;

applying the settable mixture on said cladding as a single layer; and causing the settable mixture to set so as to form said material.

13. The method of manufacturing an optical fiber having at least one Bragg grating according to claim 12, in which the step of writing said Bragg grating is performed statically.

14. The method of manufacturing an optical fiber having at least one Bragg grating according to claim 12, in which the at least one polymer precursor is selected from a thermosetting silicone precursor and a photosetting silicone precursor.

\* \* \* \* \*